United States Patent
Freudendahl

(10) Patent No.: US 10,393,274 B2
(45) Date of Patent: Aug. 27, 2019

(54) VALVE FOR CONTROL OF A FLUID FLOW

(71) Applicant: AVK Holding A/S, Galten (DK)

(72) Inventor: Erling Arnum Freudendahl, Thisted (DK)

(73) Assignee: AVK HOLDING A/S, Galten (DK)

( * ) Notice: Subject to any disclaimer, the term of this patent is extended or adjusted under 35 U.S.C. 154(b) by 0 days.

(21) Appl. No.: 15/558,367

(22) PCT Filed: Mar. 16, 2015

(86) PCT No.: PCT/DK2015/050052
§ 371 (c)(1),
(2) Date: Sep. 14, 2017

(87) PCT Pub. No.: WO2016/146124
PCT Pub. Date: Sep. 22, 2016

(65) Prior Publication Data
US 2018/0100590 A1 Apr. 12, 2018

(51) Int. Cl.
*F16K 3/14* (2006.01)
*F16K 31/50* (2006.01)
*F16K 3/12* (2006.01)

(52) U.S. Cl.
CPC .................. *F16K 3/14* (2013.01); *F16K 3/12* (2013.01); *F16K 31/508* (2013.01)

(58) Field of Classification Search
CPC . F16K 3/14; F16K 31/508; F16K 3/12; F16K 31/50; F16K 41/14; F16K 1/2028
See application file for complete search history.

(56) References Cited

U.S. PATENT DOCUMENTS

| 49,414 A | 8/1865 | Johnson |
|---|---|---|
| 2,124,334 A | 7/1938 | Gray |

FOREIGN PATENT DOCUMENTS

| CN | 2051693 | | 1/1990 |
|---|---|---|---|
| EP | 2354611 | A1 | 8/2011 |
| EP | 2696117 | A1 | 2/2014 |
| JP | 52053428 | U1 | 4/1977 |
| WO | 9519518 | A1 | 7/1995 |

(Continued)

OTHER PUBLICATIONS

International Preliminary Report on Patentability for corresponding application PCT/DK2015/050052 filed Mar. 16, 2015; dated Apr. 10, 2017.

(Continued)

*Primary Examiner* — Marina A Tietjen
(74) *Attorney, Agent, or Firm* — Cantor Colburn LLP

(57) ABSTRACT

A valve for control of a fluid flow including a valve housing, fluid control means arranged inside the valve housing, shaft means having a first shaft friction surface and a second shaft friction surface arranged in a mutual shaft friction surface angle, where the fluid control means is arranged to be displaced along a rotational axis of the shaft means in accordance with a rotation of the shaft means, and collar means having a first collar friction surface and a second collar friction surface arranged in a mutual collar friction surface angle, where the collar friction surfaces are arranged to mesh with the shaft friction surfaces, and where the shaft friction surface angle and the collar friction surface angle are between 120° and 170° and the collar means are fixed inside the valve housing.

34 Claims, 4 Drawing Sheets

(56) References Cited

FOREIGN PATENT DOCUMENTS

WO    2014177681 A1    11/2014

OTHER PUBLICATIONS

International Search Report for corresponding application PCT/DK2015/050052 filed Mar. 16, 2015; dated Dec. 7, 2015.
Written Opinion of the International Searching Authority for corresponding application PCT/DK2015/050052 filed Mar. 16, 2015; dated Dec. 7, 2015.

VALVE FOR CONTROL OF A FLUID FLOW

TECHNICAL FIELD

The invention relates a valve for control of a fluid flow. The valve comprises a valve housing and fluid control means for controlling the flow of fluid through the valve housing, wherein the fluid control means is arranged inside the valve housing. The valve also comprises shaft means.

BACKGROUND

A shaft operated valve—such as a gate valve—typically comprises a shaft provided with a threaded part meshing with a nut of a wedge. Thus, when the shaft is rotated the wedge will be displaced up or down to open or close the fluid passage through the valve.

To ensure that the shaft is axially fixed it is known from e.g. WO 95/19518 A1 to provide the valve housing with a fixed collar meshing with circular protrusions on the shaft. However, such a valve design entails a risk of damaging the wedge, the shaft or the collar when operating the valve—particularly if too much torque is applied during opening or closing of the valve.

Thus, from WO 2014/177681 A1 it is known to form the meshing contact surfaces between the collar and the shaft in a 45° angle in relation to the rotational axis of the shaft to increase the contact surface between the collar and the shaft and thereby increase the friction when the axial force is increased—e.g. when the wedge has reached an extreme position. However this way of axially fixing the shaft in relation to the valve housing is not cost-effective.

Therefore, a valve is needed comprising more cost-effective means for axially fixing the shaft in relation to the valve housing.

BRIEF SUMMARY

The invention provides for a valve for control of a fluid flow. The valve comprises a valve housing and fluid control means for controlling the flow of fluid through the valve housing, wherein the fluid control means is arranged inside the valve housing. The valve also comprises shaft means comprising a set of shaft friction surfaces, wherein the set of shaft friction surfaces includes a first shaft friction surface and a second shaft friction surface arranged in a mutual shaft friction surface angle. The shaft friction surface angle is an inside angle between the first shaft friction surface and the second shaft friction surface and the fluid control means is arranged to be displaced along the rotational axis of the shaft means in accordance with a rotation of the shaft means. The valve further comprises collar means including a set of collar friction surfaces, wherein the set of collar friction surfaces comprises a first collar friction surface and a second collar friction surface arranged in a mutual collar friction surface angle. The collar friction surface angle is an inside angle between the first collar friction surface and the second collar friction surface and the set of collar friction surfaces are arranged to mesh with the set of shaft friction surfaces and wherein the shaft friction surface angle and the collar friction surface angle are between 110° and 175°, preferably between 120° and 170°.

Making both the shaft means and the collar means comprise at least one set of friction surfaces is advantageous in that when the set of shaft friction surfaces mesh with the set of collar friction surfaces the fluid control means, the shaft means, the collar means and/or other parts of the valve will be better protected against damaging overloads no matter which extreme position fluid control means reached—e.g. no matter if a wedge of a gate valve is in fully open or fully closed position. I.e. in this way a great friction force between the shaft means and the collar means will be generated as soon as the axial force is increased—due to the fluid control means reaching an extreme position. No matter the direction of the axial force.

In known shafts and collars—such as disclosed in WO 2014/177681 A1 and WO 95/19518 A1—the collar and the shaft typically will have to comprise several corresponding surfaces to ensure that the friction between the meshing parts gets so high that the risk of damaging the different valve parts is sufficiently reduced.

However, by forming the friction surfaces of the collar means and of the shaft means in an obtuse angle in the mentioned ranges, it is possible to form the shaft means and the collar means with fewer sets of shaft friction surfaces and collar friction surfaces—such as only one set of shaft friction surfaces and collar friction surfaces—and still achieve the same degree of friction force. Hereby it is possible to reduce the manufacturing cost of the collar means and of the shaft means.

Furthermore, the obtuse angle between the respective friction surfaces is advantageous in that meshing sets of friction surfaces within the mentioned ranges will generate a wedge-effect which will amplify the friction/braking effect of the meshing shaft means and collar means thus enabling that physically smaller collar means will be able to generate sufficient friction/braking effect—thus, reducing cost and space consumption.

Even further, if the shaft friction surfaces angle and the collar friction surface angle are too little the wedging-effect becomes too little and the surface area will have to be increased accordingly to achieve the same effect. However, if the friction surface angles are too big the risk of the mutual friction surfaces actually wedging to a degree that they cannot be easily separated again becomes too high. Thus, the present angle ranges presents an advantageous relationship between efficiency and functionality.

The term "fluid control means" is in this context to be understood as any kind of gate, hatch, ball or any other kind of blocking device suitable for controlling the flow of fluid through a valve arranged below the surface of the ground.

It should also be noted that in this context the term "shaft means" should be understood as any kind of spindle, rod, axle or another kind of shaft suitable for transferring rotation from outside the valve housing and to the fluid control means inside the valve housing.

Furthermore, in this context the term "collar means" should be understood as any kind of ring, band, round flange or another kind of collar suitable for encircling the shaft means of a valve and transferring axial forces between the shaft means and the valve housing of a valve. However, it should be noted that this does not in any way exclude that the collar means could be axially and/or radially divided into more than one substantially separate parts and/or sectors and it does not exclude the collar means from being formed integrally with the valve housing or another part of the valve.

In an aspect of the invention, the shaft friction surface angle and the collar friction surface angle are substantially identical.

Forming the shaft friction surface angle and the collar friction surface angle substantially identical is advantageous in that this enables a better match of the surfaces—thus increasing friction between the shaft friction surfaces and the collar friction surfaces when forced together by axial forces/displacement of the shaft means.

In an aspect of the invention, the shaft friction surface angle and the collar friction surface angle are between 145° and 165°, such as 154°.

If the shaft friction surface angle and the collar friction surface angle are too little the wedging-effect becomes too little and the surface area will have to be increased accordingly to achieve the same effect. However, if the friction surface angles are too big the risk of the mutual friction surfaces actually wedging to a degree that they cannot be easily separated again becomes too high. Thus, the present angle ranges presents an advantageous relationship between efficiency and functionality.

In an aspect of the invention, a friction coefficient between the shaft friction surfaces and the collar friction surfaces is between 0.05 and 2, preferably between 0.1 and 1 and most preferred between 0.15 and 0.55, such as 0.35.

If the friction coefficient between the shaft friction surfaces and the collar friction surfaces is too little the meshing friction surfaces will not generate the desired braking effect and the risk of damaging parts of the valve is increased. However, if the friction coefficient between the abutting friction surfaces becomes too high more force is needed to operate the valve during normal operation. Thus, the present friction coefficient ranges presents an advantageous relationship safety and functionality.

It should be noted that in this context the term "friction coefficient" should be understood as the static friction coefficient between dry, un-lubricated friction surfaces of the shaft means and collar means.

In an aspect of the invention, a ratio between the friction surface angles and a friction coefficient between the shaft friction surfaces and the collar friction surfaces is between 150 and 1,000, preferably between 200 and 800 and most preferred between 300 and 600.

If the ratio between the friction surface angles and a friction coefficient between the friction surfaces is too little the meshing friction surfaces will not generate the desired braking effect and the risk of damaging parts of the valve is increased. However, if the ratio becomes too high more force is needed to operate the valve during normal operation and/or the risk of the friction surfaces wedging to a degree that they cannot be easily separated is increased. Thus, the present friction coefficient ranges presents an advantageous relationship safety and functionality.

In an aspect of the invention, a first transition angle between the rotational axis of the shaft means and the first shaft friction surface is substantially identical with a second transition angle between the rotational axis of the shaft means and the second shaft friction surface.

Forming the first and the second transition angles substantially identical is advantageous in that hereby the protection against damaging overloads is substantially identical no matter which extreme position the fluid control means are in. Furthermore, the more uniform design reduces manufacturing and assembly costs.

In an aspect of the invention, the first transition angle and the second transition angle is between 1° and 40°, preferably between 4° and 30° and most preferred between 8° and 20°, such as 13°.

If the transition angles are too big the wedging-effect becomes too little and abutting the surface area of the friction surfaces will have to be increased accordingly to achieve the same effect. However, if the transition angles are too little the risk of the mutual friction surfaces actually wedging to a degree that they cannot be easily separated again becomes too high. Thus, the present angle ranges presents an advantageous relationship between efficiency and functionality.

In an aspect of the invention, shaft means comprises more than one set of shaft friction surfaces.

Forming the shaft means with more than one set of shaft friction surfaces is advantageous in that it hereby is possible to distribute the shaft friction surfaces over a greater area of the shaft means thereby reducing the risk of local stress concentrations.

In an aspect of the invention, collar means comprises more than one set of collar friction surfaces.

Forming the collar means with more than one set of collar friction surfaces is advantageous in that it hereby is possible to distribute the collar friction surfaces over a greater area of the shaft means and the valve housing thereby reducing the risk of local stress concentrations.

In an aspect of the invention, the set of shaft friction surfaces are made from a first material and the set of collar friction surfaces are made from a second material, and wherein the first material is different from the second material.

If the shaft friction surfaces and the collar friction surfaces are made from the same material the risk of seizing is drastically increased. Thus it is advantageous to form the abutting friction surfaces of different material.

In an aspect of the invention, the set of shaft friction surfaces are made from stainless steel.

In a valve the shaft means will typically extend outside the valve housing to enable that the fluid control means may be operated from outside the valve housing. However, since the valve is often buried underground or in other ways located in harsh environment it is advantageous to form the shaft means in a durable and inert material such as stainless steel.

In an aspect of the invention, the set of collar friction surfaces are made from brass.

Brass is a relatively hard and strong material making it suited for forming the set of collar friction surfaces.

In an aspect of the invention, the set of shaft friction surfaces are formed circumferential on an outside of the shaft means and in an aspect of the invention, the collar friction surfaces are formed on an inside of the collar means which enables that the shaft friction surfaces and the collar friction surfaces may easily mesh.

In an aspect of the invention, the collar means comprises at least one full solid ring.

Forming the collar means as a continuous ring is advantageous in that it simplifies the manufacturing process and reduces logistical problems.

In an aspect of the invention, the collar means are mounted on the shaft means by means of shrinkage.

If the shaft friction surfaces and the collar friction surfaces have to mesh and the collar means are formed as a continuous ring, it is advantageous to mount the collar means on the shaft means by means of shrinkage in that this ensures that the friction surfaces are in close contact with each other after the mounting process.

In an aspect of the invention, the collar means are formed by more than one radially divided collar sector parts.

Forming the collar means from radially divided collar sector parts is advantageous in that it enables that the collar means easily can be mounted on the shaft means.

In an aspect of the invention, the collar means substantially encircles the shaft means.

Forming the collar means so that they substantially encircles the shaft means are advantageous in that it hereby is possible to form a larger contact area between the shaft friction surfaces and the collar friction surfaces.

In an aspect of the invention, the collar friction surfaces substantially encircle the shaft friction surfaces.

Forming the collar friction surfaces so that they substantially encircles the shaft friction surfaces are advantageous in that it hereby is possible to form a larger contact area between the shaft friction surfaces and the collar friction surfaces.

In an aspect of the invention, the valve further comprises rotational locking means for substantially locking the collar means and the valve housing against mutual rotation.

Once the axial force of the shaft means reaches a certain level the friction between the collar friction surfaces and the shaft friction surfaces will become so high that the collar means will rotate along with the shaft means which will drastically reduce the friction effect of the collar and thereby increase the risk of overloading one or more parts of the valve when the fluid control means reaches an extreme position. It is therefore advantageous to valve with rotational locking means so that the collar means are rotationally fixed in relation to the valve housing.

In an aspect of the invention, the rotational locking means comprises collar locking parts of the collar means and valve locking parts of the valve housing.

Hereby is achieved an advantageous embodiment of the invention.

In an aspect of the invention, the collar locking parts and the valve locking parts are meshing.

Forming the collar means and the valve housing with mutually meshing locking parts is advantageous in that this enables efficient rotational locking of the collar means in relation to the valve housing.

In an aspect of the invention, the collar locking parts are protruding from the collar means and wherein the valve locking parts are formed as one or more indentations in the valve housing.

Hereby is achieved an advantageous embodiment of the invention.

In an aspect of the invention, the fluid control means comprise nut means arranged to mesh with a threaded part of the shaft means.

Forming the fluid control means with nut means meshing with a threaded part of the shaft means is advantageous in that it hereby is possible to displace the nut means with a relatively large force, simply by rotating the shaft means.

In an aspect of the invention, the fluid control means comprise wedge means arranged to be linearly displaced inside the valve housing.

Hereby is achieved an advantageous embodiment of the invention.

In an aspect of the invention, an intersection area between the first shaft friction surface and the second shaft friction surface comprises a chamfer or a rounding.

E.g. rounding the apex between two adjacent friction surfaces is advantageous in that this makes the apex more durable.

In an aspect of the invention, the first shaft friction surface and the second shaft friction surface are axially spaced apart on the shaft means.

Forming first shaft friction surface a distance away from the second shaft friction surface on the shaft means—so that the first and the second shaft friction surface are not adjacent—is advantageous in that this enables a more advantageous shaft means design under certain circumstances.

In an aspect of the invention, the first collar friction surface and the second collar friction surface are axially spaced apart on the shaft means.

Forming first collar friction surface a distance away from the second collar friction surface on the shaft means—so that the first and the second collar friction surface are not adjacent—is advantageous in that this enables that the collar means under certain circumstances might be better fitted in the valve housing.

In an aspect of the invention, the collar means comprises at least two axially divided collar ring parts.

Dividing the collar means into a number of axially divided collar ring parts is advantageous in that this can enable simpler fitting of the collar means on the shaft means and/or it can enable a simpler manufacturing process.

In an aspect of the invention, the set of shaft friction surfaces abuts the set of collar friction surfaces.

In an aspect of the invention, a first collar ring part of the at least two axially divided collar ring parts comprise the first collar friction surface and wherein the second collar ring part of the at least two axially divided collar ring parts comprise the second collar friction surface.

Forming the two collar friction surface on separate collar ring parts is advantageous in that this can enable simpler fitting of the collar means on the shaft means and/or it can enable a simpler manufacturing process.

In an aspect of the invention, the valve comprises lubrication means arranged to supply lubrication between at least a part of the set of shaft friction surfaces and the set of collar friction surfaces.

Arranging lubrication means in or on the valve is advantageous in that it hereby is possible to at least occasionally lubricate the abutting surfaces between the shaft friction surfaces and the collar friction surfaces and hereby reduce friction during normal operation of the valve.

It should be noted that in this context the term "lubrication means" should be understood as any kind of hole, channel, duct or other in the collar means, the shaft means, the valve housing or other suited for distributing lubrication or any other kind of passive or active lubricator suited for supplying lubrication between at shaft friction surfaces and collar friction surfaces of a valve.

In an aspect of the invention, the valve is selected from the group consisting of: shaft operated gate valves, globe valves, knife valves, needle valves and plug valves.

A common characteristic of the above mentioned valve types is that they all comprise shaft through which the status of the internal fluid control means is controlled by rotation of the shaft. Thus, if any of these valves e.g. is overtightened when closed, one or more parts of the valve could break or be deformed due to the overload. It is therefore particularly advantageous to use the present invention in relation with one or more of the above mentioned valve types.

In an aspect of the invention, the valve is a shaft operated gate valve.

In gate valves the wedge travels a relative long distance to open or close the valve. Thus, in shaft operated gate valves the shaft has to be long and is therefore particularly vulnerable in relation to axial overload which more easily may deform the long and slender shaft means of this type of valve. It is therefore particularly advantageous to use the present invention in relation with this specific valve type.

In an aspect of the invention, the collar means are formed integrally with the valve housing.

Forming the collar means are formed integrally with the valve housing is advantageous in that it simplifies manufacturing, assembly and handling of the valve.

BRIEF DESCRIPTION OF THE DRAWINGS

An embodiment of the invention will be described, by way of non-limiting example, in the following with reference to the figures in which.

DETAILED DESCRIPTION

Figure 1:
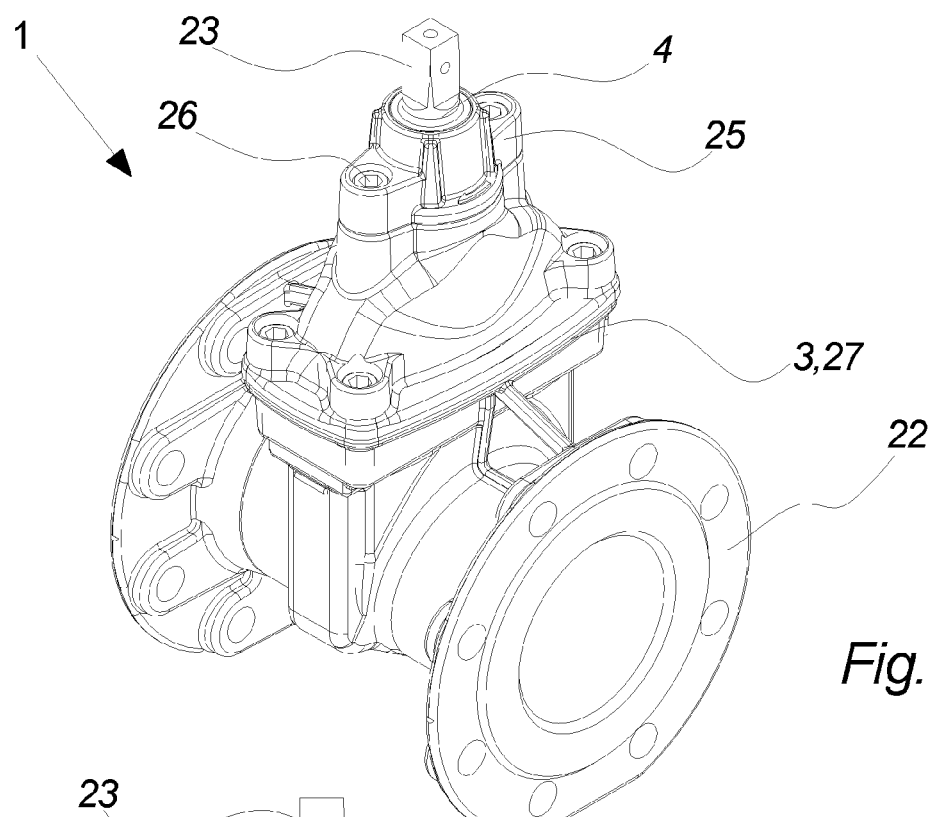
FIG. 1. illustrates a gate valve, as seen in perspective.
Figure 2:
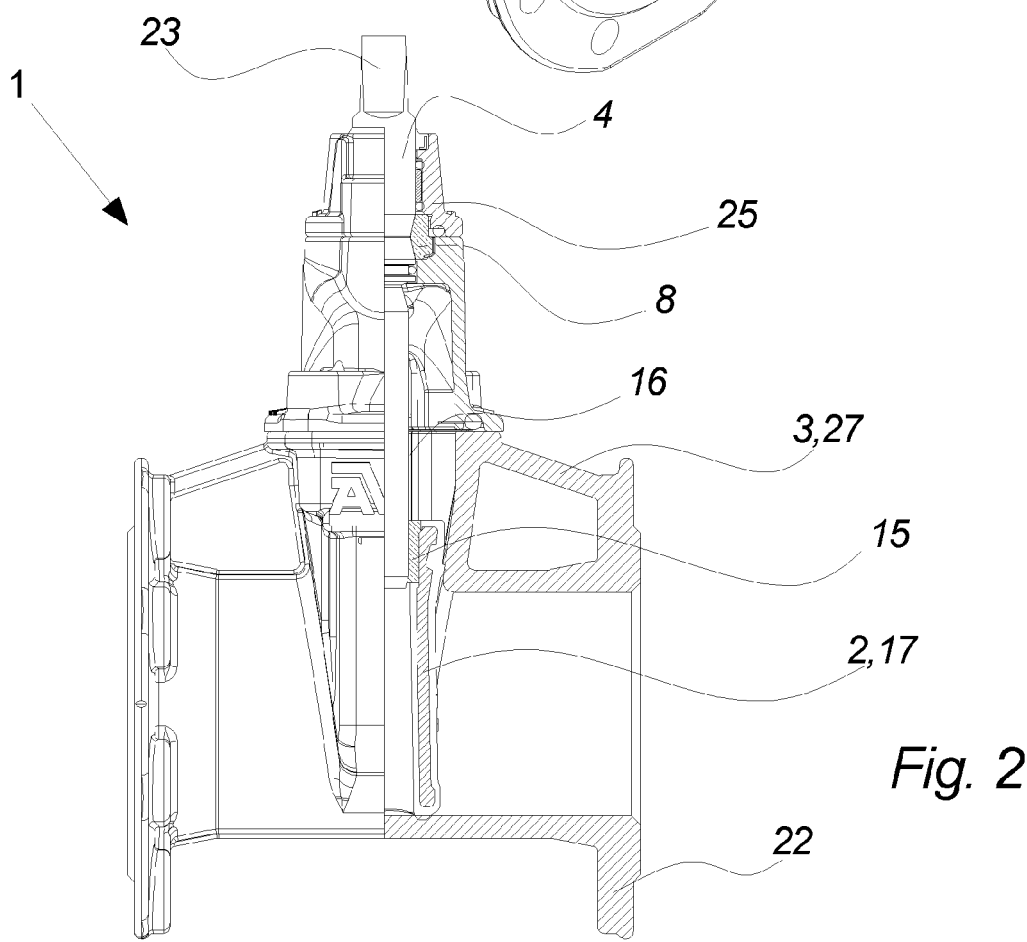
FIG. 2 illustrates a partial cross section through the middle of a gate valve, as seen from the front.

FIG. 1 illustrates a gate valve 1, as seen in perspective and FIG. 2 illustrates a partial cross section through the middle of a gate valve 1, as seen from the front.

A gate valve 1, also known as a sluice valve, is a valve 1 that opens by lifting wedge means 17 out of the path of a fluid passing through the valve housing 3 of the valve 1. A distinct feature of a gate valve 1 is the sealing surfaces between the wedge means 17 and wedge means seats are substantially planar, so gate valves 1 are often used when a straight-line flow of fluid and minimum restriction is desired. The faces of the wedge means 17 of a gate valve 1 are often at least partly wedge shaped, but they can also be parallel.

In this embodiment the valve 1 comprises a valve housing 3 in which fluid control means 2 are arranged to allow or prevent flow of fluid through the valve housing 3.

In this embodiment the valve housing comprises end flanges 22 enabling that the valve 1 may be connected to a pipe (not shown) at either end of the valve housing 3.

In this embodiment a shaft means 4 in the form of a stem 4 extends down through the top of the valve housing 3. In this embodiment the bottom part of the shaft means 4 is provided with external thread 16 meshing with internal thread of nut means 15. The nut means 15 is rigidly connected to the wedge means 17 so that when the shaft means 4 is rotated the nut means 15 and the wedge means 17 will travel up and down the shaft means 4 depending of the direction of the rotation i.e. the fluid control means 2 are arranged to be displaced along the rotational axis 7 of the shaft means 4 in accordance with rotation of the shaft means 4. Thus, when the wedge means 17 reaches an extreme position—either fully closed or fully open—the wedge means 17 will be physically blocked against further travel. So if the shaft means 4 does not stop rotating in—when an extreme position has been reached—the rotation will generate a substantial axial load on the shaft means 4, the fluid control means 2 or other parts of the valve 2 and if the rotation is not stopped in time the shaft means 4, the wedge means 17 or other may be deformed or the valve 1 may in another way be damaged by the axial load.

Thus, in this embodiment the shaft means 4 is substantially fixed against axial displacement by means of collar means 8 comprising a set of collar friction surfaces 9, 10 arranged to mesh with a set of shaft friction surfaces 5, 6 of the shaft means 4. The collar means 8 is substantially fixed against axial displacement by radial surfaces of the valve housing 3.

In this embodiment the upper end of the shaft means extends out of the valve housing 3 and is provided with a connection arrangement 23 in the form of four flat surfaces providing the upper end of the shaft means 4 with a square shape. The connection arrangement 23 enables that the shaft means 4 may be manually rotated e.g. by means of a key, a wrench, a hand wheel or other or automatically operated by means of a motor, an actuator or other.

In another embodiment the valve 1 could be a globe valve 1 comprising fluid control means 2 including a movable disk-type element and a stationary ring seat in a generally spherical body. Globe valves 1 are named for their spherical body shape with two halves of the valve housing being separated by an internal baffle. This has an opening that forms a seat onto which a movable plug of the fluid control means 2 can be screwed in to close (or shut) the valve 1. The plug is also called a disc or disk. In globe valves 1, the plug is connected to a shaft means 4 which can be operated from outside the valve housing 3.

In another embodiment the valve 1 could be a knife valve 1 which essentially is the same as a gate valve 1 where the wedge means 17 is formed with a knife shape enabling that the wedge means 17 made cut through extremely thick liquids or semi-liquids.

In another embodiment the valve 1 could be a needle valve 1 which is a type of valve wherein the fluid control means 2 comprises a small port and a threaded, needle-shaped plunger. This type of valve 1 allows precise regulation of flow, although it is generally only capable of relatively low flow rates.

Or, in another embodiment the valve 1 could be another type of shaft operated valve.

Figure 3:
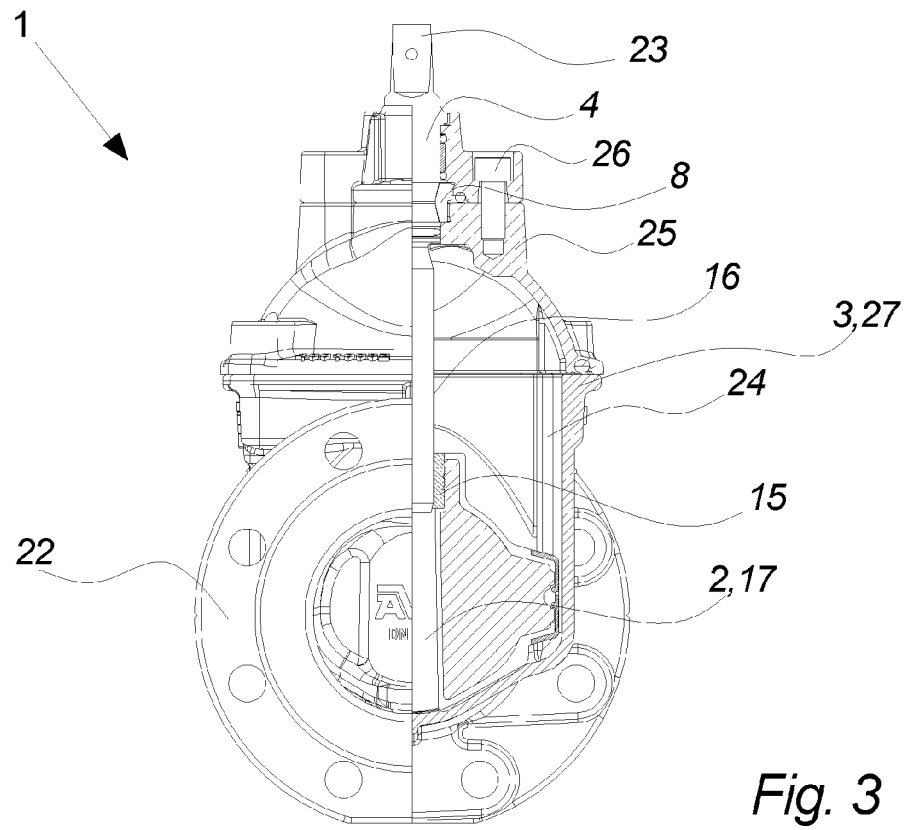
FIG. 3 illustrates a partial cross section through the middle of a gate valve, as seen from the side.

FIG. 3 illustrates a partial cross section through the middle of a gate valve 1, as seen from the side.

To prevent the wedge means 17 from rotating along with the rotation of the shaft means 4, the wedge means 17 is in this embodiment arranged to be guided by guide means 24 extending along either side of the valve housing 3.

Figure 4:
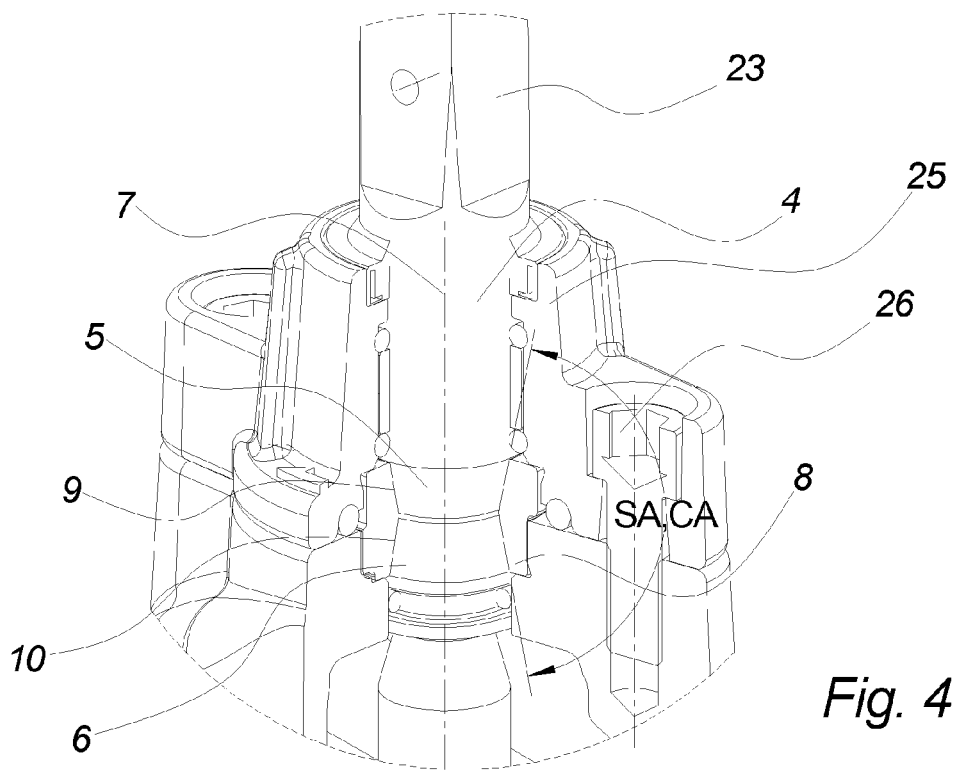
FIG. 4 illustrates a partial cross section of the top of a valve, as seen in perspective.

FIG. 4 illustrates a partial cross section of the top of a valve 1, as seen in perspective.

In this embodiment the valve housing 3 comprises a top part 25 attached to the bottom part 27 of the valve housing 3 by means of bolts 26. During assembly of the valve 1 the shaft means 4 and the collar means 8 are in this embodiment first placed in the bottom part 27 where after the top part 25 is mounted so that the radial and particularly the axial position of the collar means 8 is substantially fixed. However, in another embodiment the position of the collar means 8 could be fixed in relation valve housing 3 in another way—e.g. by means of special fittings, by means of screws or bolts, by means of welding or in another way—or the collar means 8 could be formed integrally with the valve housing 3.

The shaft friction surface angle SA and the collar friction surface angle CA is the mutual inside angle between respectively the first and the second shaft friction surface 5, 6 and the first and the second collar friction surfaces 9, 10. In this embodiment the shaft friction surfaces 5, 6 completely match the collar friction surfaces 9, 10 so that both the shaft friction surface angle SA and the collar friction surface angle CA are 154°. However, in another embodiment these angle might be bigger such as 158°, 162°, 168° or even bigger or smaller such as 151°, 148°, 141° or even smaller. It should also be noted that when the term "completely match" is used in the above it does obviously not exclude that there is some sort of tolerance or even clearance between the opposing surfaces 5, 6, 9, 10—i.e. there will obviously be some sort of production tolerance, there will be differences due to wear and tear and there could be deliberate tolerance or clearance so that the opposing surfaces 5, 6, 9, 10 do substantially not touch during travel between the extreme positions of the fluid control means 2.

Figures 5, 6, 7:
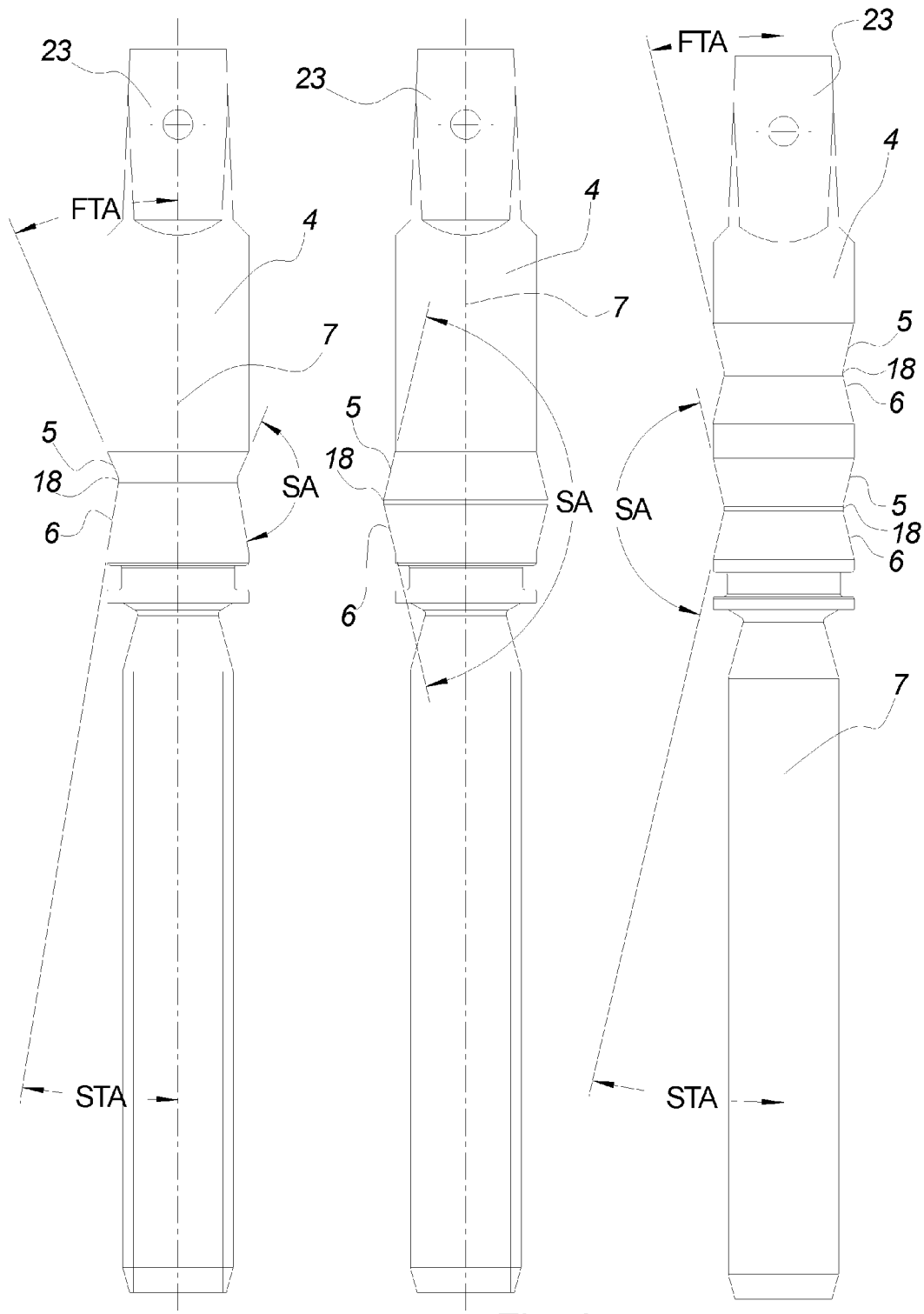
FIG. 5 illustrates a first embodiment of shaft means, as seen from the front.
FIG. 6 illustrates a second embodiment of shaft means, as seen from the front.
FIG. 7 illustrates a third embodiment of shaft means, as seen from the front.

In this embodiment the first transition angle FTA between the rotational axis 7 of the shaft means 4 and the first shaft friction surface 5 is substantially identical with the second transition angle STA between the rotational axis 7 and the second shaft friction surface 6 as also disclosed in FIGS. 6 and 7. Therefore in this embodiment where the shaft friction surface angle SA is 154° both the first and the second transition angle FTA, STA are 13°. However, as disclosed in relation with FIG. 5 these angles may vary in other embodiment of the invention. An intersection area 18 is disposed between the first and second shaft friction surfaces 5, 6.

In this embodiment the shaft means 4 are made from stainless steel but in another embodiment it could be made from steel, cast iron, titanium, brass, aluminum or another metal or another material such as plastic, wood, ceramics or other or any combination thereof.

In this embodiment the collar means 8 are made from brass but in another embodiment it could be made from steel, cast iron, titanium, bronze, aluminum or another metal or another material such as plastic, wood, ceramics or other or any combination thereof.

In another embodiment at least one of the matching surfaces 5, 6, 9, 10 could comprise some sort of surface treatment e.g. arranged to increase or decrease friction, to extend the life of the surfaces 5, 6, 9, 10, to prevent corrosion, to enable lubrication—e.g. self-lubrication or other. I.e. in another embodiment one or more of the matching surfaces 5, 6, 9, 10 could comprise a coating of another metal type, of ceramic, of a composite material, of a plastic material or another type of surface treatment. Or in another embodiment one or more of the surfaces 5, 6, 9, 10 could be tempered or at least comprise some sort of tempering treatment.

Thus, when the shaft means 4 are made from stainless steel and the collar means 8 are made from brass the friction coefficient between the shaft friction surfaces 5, 6 and the collar friction surfaces 9, 10 will in this case be around 0.35. However, in another embodiment—particularly if one of both of the shaft means 4 and the collar means 8 are made from a different material—the friction coefficient could be bigger—such as 0.45, 0.6, 0.7 or even bigger—or smaller—such as 0.3, 0.25, 0.2 or even smaller.

When the friction surface angles SA, CA are 154° and the friction coefficient is 0.35 the ratio between friction surface angles SA, CA and the friction coefficient between the shaft friction surfaces 5, 6 and the collar friction surfaces 9, 10 is in this case 440. However, dependent on friction surface angles SA, CA, type of material, possible lubrication, temperature and other this ratio could in another embodiment be higher—such as 490, 525, 575 or even higher—or lower—such as 400, 370, 320 or even lower.

FIG. 5 illustrates a first embodiment of shaft means 4, as seen from the front.

In this embodiment the shaft friction surface angle SA between the first shaft friction surface 5 and the second shaft friction surface 6 is around 148°. However, in this embodiment the first transition angle FTA between the rotational axis 7 of the shaft means 4 and the first shaft friction surface 5 is not identical with the second transition angle STA between the rotational axis 7 and the second shaft friction surface 6. I.e. in this embodiment the first transition angle FTA is around 23° and the second transition angle STA is around 9°. The difference in transition angles FTA, STA will in this embodiment entail that the more friction will be generated when the valve 1 reaches its closed position then when it reaches its extreme open position.

In other embodiments the difference in transition angles FTA, STA could be different e.g. depending on the specific use, the specific valve type or other.

The obtuse shaft friction surface angle SA enables that the minimum diameter of the shaft means does not have to be reduced—i.e. due to the obtuse shaft friction surface angle SA the first shaft friction surface 5 and the second shaft friction surface 6 can be made relatively wide substantially without compromising the strength of the shaft means 4.

FIG. 6 illustrates a second embodiment of shaft means 4, as seen from the front.

In the embodiment disclosed in the other figures the shaft friction surfaces 5, 6 are formed as an indentation in the shaft means 4 and the collar friction surfaces 9, 10 of the collar means 8 are formed as a protrusion arranged to mesh with the matching shaft friction surfaces 5, 6. However, in this embodiment the designs are reversed so that the shaft friction surfaces 5, 6 are formed as a protrusion arranged to mesh with a matching indentation formed by the collar friction surfaces 9, 10 of the collar means 8.

In embodiments disclosed in all the figures, the shaft friction surfaces 5, 6 are formed integrally with the shaft means 4. However in another embodiment the shaft friction surfaces 5, 6 could be formed separate form—but attached rigidly to—the shaft means 4—e.g. by means of bolts, welding, adhesives or other.

FIG. 7 illustrates a third embodiment of shaft means 4, as seen from the front.

In the embodiment disclosed in the other figures the shaft means 4 only comprise one set of shaft friction surfaces 5, 6. In this embodiment the shaft means 4 comprise two sets of shaft friction surfaces 5, 6 and in another embodiment the shaft means 4 could comprise more sets of shaft friction surfaces 5, 6—such as three, four, five or even more.

Figure 8:
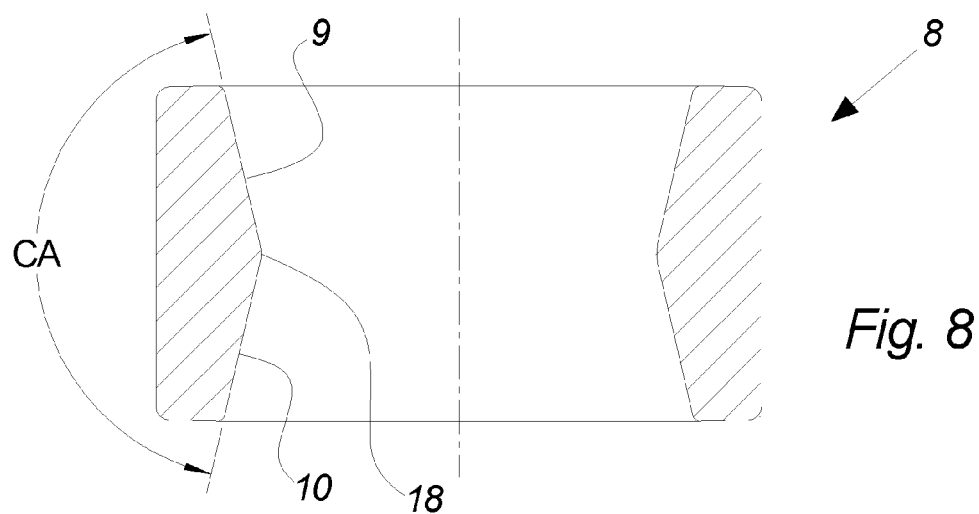
FIG. 8 illustrates a cross section through the middle of collar means, as seen from the front.

FIG. 8 illustrates a cross section through the middle of collar means 8, as seen from the front.

In this embodiment the collar means 8 are formed as a single full solid ring arranged to completely encircle the shaft means 4. In this case the collar means 8 could advantageously be mounted on the shaft friction surfaces 5, 6 by means of shrinking—although other assembly methods also are available to the skilled person.

Figure 9:
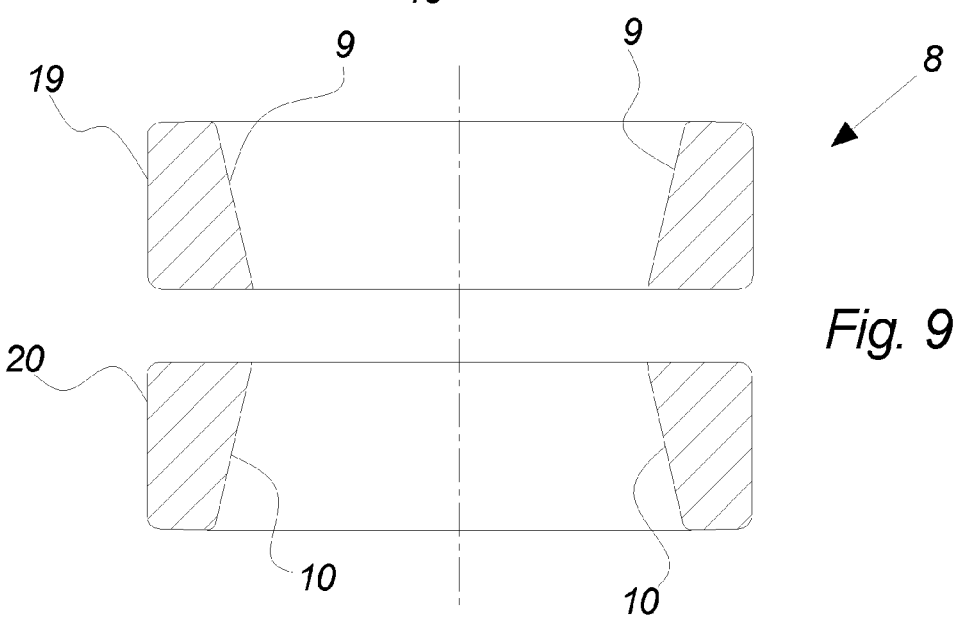
FIG. 9 illustrates a cross section through the middle of collar means formed by two individual collar ring parts, as seen from the front.

FIG. 9 illustrates a cross section through the middle of collar means 8 formed by two individual collar ring parts 19, 20, as seen from the front.

In this embodiment the collar means 8 is divided into two separated collar ring parts enabling that the first collar friction surface 9 may be mounted separately from the second collar friction surface 10 on the shaft mean 4.

Figure 10:
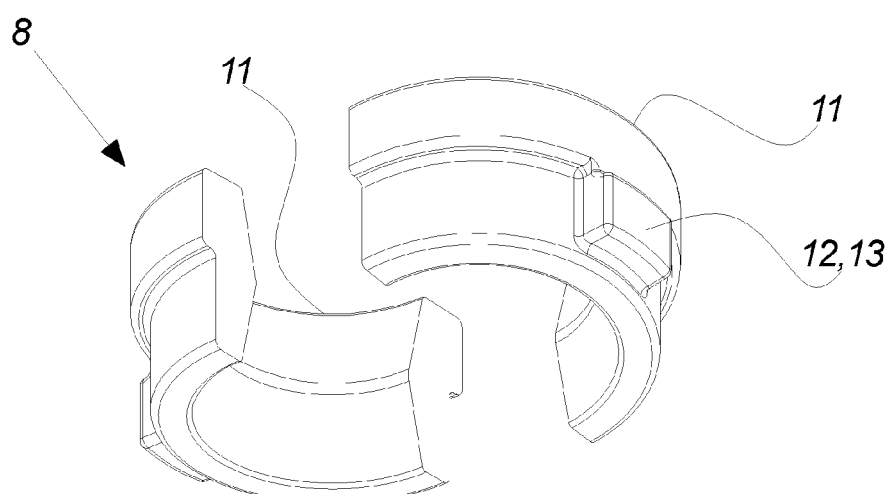
FIG. 10 illustrates collar means formed by two collar sector parts, as seen in perspective.

FIG. 10 illustrates collar means 8 formed by two collar sector parts 11, as seen in perspective.

In this embodiment the collar means 8 is divided into two separate collar sector parts 11 arranged to substantially fully encircle the shaft means 4 when mounted in the valve housing 3.

In this embodiment the collar means 8 is further provided with rotational locking means 12 in the form of collar locking parts 13 arranged to mesh with corresponding valve locking parts of the valve housing 3 to substantially lock the collar means 8 and the valve housing 3 against mutual rotation.

However, in another embodiment the rotational locking means 12 could be formed by forming the collar means 8 oval, square or with another shape arranged to match a similar seat in the valve housing 3. Or the rotational locking means 12 could comprise a dedicated fixture, bolts or other means capable of locking the collar means 8 and the valve housing 3 against mutual rotation.

The invention has been exemplified above with reference to specific examples of valves 1, shaft means 4, collar means 8 and other. However, it should be understood that the invention is not limited to the particular examples described above but may be designed and altered in a multitude of varieties within the scope of the invention as specified in the claims.

The invention claimed is:

1. A valve for control of a fluid flow, said valve comprising
    a valve housing,
    fluid control means for controlling said flow of fluid through said valve housing wherein said fluid control means is arranged inside said valve housing,
    shaft means comprising a set of shaft friction surfaces, said set of shaft friction surfaces including a first shaft friction surface and a second shaft friction surface arranged in a mutual shaft friction surface angle, wherein said shaft friction surface angle is an inside angle between said first shaft friction surface and said second shaft friction surface, wherein said fluid control means is arranged to be displaced along a rotational axis of said shaft means in accordance with a rotation of said shaft means, and
    collar means comprising a set of collar friction surfaces, said set of collar friction surfaces including a first collar friction surface and a second collar friction surface arranged in a mutual collar friction surface angle, said collar friction surface angle is an inside angle between said first collar friction surface and said second collar friction surface, wherein said set of collar friction surfaces are arranged to mesh with said set of shaft friction surfaces,
    wherein said shaft friction surface angle and said collar friction surface angle are between 120° and 170° and wherein said collar means are fixed inside said valve housing.

2. A valve according to claim 1, wherein said shaft friction surface angle and said collar friction surface angle are substantially identical.

3. A valve according to claim 1, wherein said shaft friction surface angle and said collar friction surface angle are between 145° and 165°.

4. A valve according to claim 1, wherein a friction coefficient between said shaft friction surfaces and said collar friction surfaces is between 0.05 and 2.

5. A valve according to claim 1, wherein a ratio between said friction surface angles and a friction coefficient between said shaft friction surfaces and said collar friction surfaces is between 150 and 1,000.

6. A valve according to claim 1, wherein a first transition angle between said rotational axis of said shaft means and said first shaft friction surface is substantially identical with a second transition angle between said rotational axis of said shaft means and said second shaft friction surface.

7. A valve according to claim 6, wherein said first transition angle and said second transition angle is between 1° and 40°.

8. A valve according to claim 1, wherein shaft means comprises more than one set of shaft friction surfaces.

9. A valve according to claim 1, wherein said collar means comprises more than one set of collar friction surfaces.

10. A valve according to claim 1, wherein said set of shaft friction surfaces are made from a first material and said set of collar friction surfaces are made from a second material, and wherein said first material is different from said second material.

11. A valve according to claim 1, wherein said set of shaft friction surfaces are made from stainless steel.

12. A valve according to claim 1, wherein said set of collar friction surfaces are made from brass.

13. A valve according to claim 1, wherein said set of shaft friction surfaces are formed circumferential on an outside of said shaft means.

14. A valve according to claim 1, wherein said collar friction surfaces are formed on an inside of said collar means.

15. A valve according to claim 1, wherein said collar means comprises at least one full solid ring.

16. A valve according to claim 1, wherein said collar means is mounted on said shaft means by means of shrinkage.

17. A valve according to claim 1, wherein said collar means is formed by more than one radially divided collar sector parts.

18. A valve according to claim 1, wherein said collar means substantially encircles said shaft means.

19. A valve according to claim 1, wherein said collar friction surfaces substantially encircles said shaft friction surfaces.

20. A valve according to claim 1, wherein said valve further comprises rotational locking means for substantially locking said collar means and said valve housing against mutual rotation.

21. A valve according to claim 20, wherein said rotational locking means comprises collar locking parts of said collar means and valve locking parts of said valve housing.

22. A valve according to claim 21, wherein said collar locking parts and said valve locking parts are meshing.

23. A valve according to claim 20, wherein said collar locking parts are protruding from said collar means and wherein said valve locking parts are formed as one or more indentations in said valve housing.

24. A valve according to claim 1, wherein said fluid control means comprise nut means arranged to mesh with a threaded part of said shaft means.

25. A valve according to claim 1, wherein said fluid control means comprise wedge means arranged to be linearly displaced inside said valve housing.

26. A valve according to claim 1, wherein an intersection area between said first shaft friction surface and said second shaft friction surface comprises a chamfer or a rounding.

27. A valve according to claim 1, wherein said first shaft friction surface and said second shaft friction surface are axially spaced apart on said shaft means.

28. A valve according to claim 1, wherein said first collar friction surface and a second collar friction surface are axially spaced apart.

29. A valve according to claim 1, wherein said collar means comprises at least two axially divided collar ring parts.

30. A valve according to claim 29, wherein a first collar ring part of said at least two axially divided collar ring parts comprises said first collar friction surface and wherein a second collar ring part of said at least two axially divided collar ring parts comprises said second collar friction surface.

31. A valve according to claim 1, wherein said valve comprises lubrication means arranged to supply lubrication between at least a part of said set of shaft friction surfaces and said set of collar friction surfaces.

32. A valve according to claim 1, wherein said valve is selected from the group consisting of: shaft operated gate valves, globe valves, knife valves, needle valves and plug valves.

33. A valve according to claim 1, wherein said valve is a shaft operated gate valve.

34. A valve according to claim 1, wherein said collar means are formed integrally with the valve housing.

* * * * *